US006559760B2

(12) United States Patent
Samejima et al.

(10) Patent No.: US 6,559,760 B2
(45) Date of Patent: May 6, 2003

(54) PLATFORM MONITORING SYSTEM

(75) Inventors: Akitaka Samejima, Yokohama (JP); Takayuki Araki, Yokohama (JP)

(73) Assignee: Koito Industries, Ltd,, Yokohama (JP)

( * ) Notice: Subject to any disclaimer, the term of this patent is extended or adjusted under 35 U.S.C. 154(b) by 103 days.

(21) Appl. No.: 09/865,535

(22) Filed: May 29, 2001

(65) Prior Publication Data

US 2001/0050709 A1 Dec. 13, 2001

(30) Foreign Application Priority Data

May 31, 2000 (JP) ........................................ 2000-163841
Apr. 13, 2001 (JP) ........................................ 2001-116041

(51) Int. Cl.[7] .............................................. B60Q 1/00
(52) U.S. Cl. ................... 340/425.5; 340/426; 340/539; 340/937; 340/506; 340/3.1
(58) Field of Search .............................. 340/425.5, 426, 340/937, 506, 3.1, 539

(56) References Cited

U.S. PATENT DOCUMENTS

| | | | | |
|---|---|---|---|---|
| 4,430,802 A | * | 2/1984 | Cole | 33/203.12 |
| 4,866,626 A | * | 9/1989 | Egli | 701/207 |
| 4,905,151 A | * | 2/1990 | Weiman | 701/28 |
| 4,908,705 A | * | 3/1990 | Wight | 348/145 |
| 4,950,118 A | * | 8/1990 | Mueller et al. | 414/274 |
| 5,333,076 A | * | 7/1994 | Wight | 359/556 |
| 5,555,019 A | * | 9/1996 | Dole | 348/148 |
| 5,644,078 A | * | 7/1997 | Ahdoot | 73/178 R |
| 5,953,688 A | * | 9/1999 | Su et al. | 702/185 |
| 6,255,942 B1 | * | 7/2001 | Knudsen | 340/506 |

FOREIGN PATENT DOCUMENTS

| | | |
|---|---|---|
| JP | 62-16636 | 1/1987 |
| JP | 10-304346 | 11/1998 |
| JP | 11-331816 | 11/1999 |

OTHER PUBLICATIONS

7th World Congress on Intelligent Transport Systems on Nov. 6–9, 2000; pp. 1–7; at Turin, Italy.

* cited by examiner

*Primary Examiner*—Daryl Pope
(74) *Attorney, Agent, or Firm*—Armstrong, Westerman & Hattori, LLP

(57) ABSTRACT

A platform monitoring system includes a camera for capturing a situation on a platform. An image captured by the camera is transmitted from a light emitter on the ground side as an optical signal and also transmitted from a transmission antenna on the ground side as a radio wave signal. These signals are received by an optical receiver and a reception antenna, respectively, mounted in a leading end portion of a vehicle. When the vehicle is positioned in a region around a stopping position, an image carried by the optical signal is selectively displayed on a monitor disposed near an operator's seat in the vehicle. When the vehicle is positioned out of the region around the stopping position, an image carried by the radio wave signal is selectively displayed on the monitor near the operator's seat in the vehicle.

12 Claims, 10 Drawing Sheets

PLATFORM MONITORING SYSTEM

BACKGROUND OF THE INVENTION

The present invention relates to a platform monitoring system which permits an operator or the like on the vehicle side such as a vehicle running on a track to monitor a situation on a platform (how passengers are getting on and off a train, and so on).

When a train stopping at a platform is to leave the platform, it is necessary to confirm the safety as to whether or not any passenger is being caught by a door of the train, and so on before the train is started. Not only that, a continuous safety check is requested in some cases as to whether or not any passenger caught by a door is being dragged in a predetermined range of running immediately after the start as well to duplicate the safety check such that neglected safety check before the start will never result in a grave accident.

While a crew has visually confirmed the safety as mentioned in the past, a platform monitoring system has been provided for permitting an operator or the like to monitor a situation on a platform as so-called one-man operated trains, without crews, have been increasingly introduced.

An example of a conventional platform monitoring system will be described with reference to FIG. 5. FIG. 5 is a schematic plan view generally illustrating an exemplary configuration of some components of a conventional platform monitoring system. In FIG. 5, reference numeral 1 designates a track; 2, a vehicle (a train in the illustrated example) running on the track 1; 3, a platform; and an arrow X, a direction in which the vehicle 2 runs.

The conventional platform monitoring system illustrated in FIG. 5 comprises television cameras 4a–4c installed on the ground side for capturing situations on the platform 3; an optical wireless transmission system for transmitting images captured by the television cameras 4a–4c to the vehicle side as optical signals; and a television monitor (not shown) installed near an operator's seat in the vehicle 2 for displaying images transmitted by the optical wireless transmission system. The optical wireless transmission system comprises an optical transmitter installed on the ground side, and an optical receiver installed on the side of the vehicle 2. The optical transmitter has a multiplicity of light emitters 5a–5e installed on the ground side, while the optical receiver has an light receiver 6 mounted at a leading end of the vehicle 2. The multiplicity of light emitters 5a–5e are disposed at predetermined intervals along the track 1, as illustrated in FIG. 5, such that they cover a desired vehicle position range R1 in which signal transmission can be achieved.

The multiplicity of light emitters 5a–5e are used in this way because each of the light emitters has a light emitting angle so narrow that a single light emitter cannot cover the desired range R1. In FIG. 5, the position of the vehicle 2 is indicated as the position of the leading end of the vehicle 2 for convenience of explanation. Since the track 1 extends in the horizontal direction in the figure, vehicle positions P0-P2 in the figure are indicated at positions in the horizontal direction in the figure. Position P0 indicates a predetermined stopping position on the platform 3 at which the vehicle 2 should be stopped. The range R1 extends from position P1 to position P2, where position P1 is defined at a position slightly in front of stopping position P0 in the vehicle running direction (indicated by the arrow X) (on the right side in FIG. 5), and position P2 is defined at a predetermined position behind stopping position P0 in the vehicle running direction (on the left side in FIG. 5). Position P2 is set in accordance with the length of the vehicle 2 and a distance over which a continuous safety check is desired for checking whether or not any passenger is caught by a door and dragged after the vehicle 2 has been started from the platform 3.

According to the conventional platform monitoring system, when the vehicle 2 is positioned within the range R1, images representing situations (situations of passengers getting on and off the vehicle) on the platform 3 captured by the cameras 4a–4c are transmitted from the ground side to the side of the vehicle 2 through the light emitters 5a–5e and the light receiver 6, and displayed on the television monitor near the operator's seat in the vehicle 2. Thus, the operator of the vehicle 2, viewing the display, not only can make a safety check as to whether any passenger is caught by a door while the vehicle 2 remains stopped at position P0 with respect to the platform 3, but also can continue the safety check as to whether any passenger caught by a door is being dragged also in the predetermined range of running immediately after the vehicle 2 has been started.

In addition, according to the conventional platform monitoring system, the optical wireless transmission system is employed as a wireless transmission system for transmitting images from the ground side to the side of the vehicle 2, and light is employed as a transmission medium, so that, unlike the employment of radio waves as a transmission medium, images representing situations on the platform 3 can be transmitted without fail and displayed on the television monitor in the vehicle 2 without suffering from noise which could be generated due to multiple reflection (multipath).

However, since the conventional platform monitoring system requires the multiplicity of light emitters 5a–5e, a higher cost is inevitable, and the installation of the light emitters also requires significant time and labor. Particularly, if a portion of the track 1 behind the platform 3 in the vehicle running direction (on the left side in FIG. 5) is curved, a further increased number of light emitters 5a–5e must be installed, thereby resulting in a further increase in the cost and labor for the installation.

As an alternative, it is contemplated to use a radio wave based wireless transceiver as a wireless transmission system in place of the optical wireless transmission system. In this case, since radio waves tend to be less directive and therefore propagate over a wider range as compared with the light, the number of transmitters can be reduced. It is therefore possible to greatly reduce the cost and labor for installation, as compared with the employment of the optical wireless transmission system.

However, the radio wave based wireless transceiver, if employed, is more susceptible to noise due to multiple reflection (multipath). As a result, depending on a nearby situation (existence of wall surfaces and other buildings), the vehicle 2 may be located at a position at which images available for monitoring for a safety check cannot be displayed on the television monitor at the operator's seat. Such a position may be coincident with the stopping position P0 of the vehicle 2 with respect to the platform 3. In this event, notwithstanding the fact that the monitoring of situations on the platform 3 is most important when the vehicle 2 remains stopped at the stopping position P0 (i.e., when passengers are getting on and off) for ensuring the safety for the passengers, the monitoring is disabled, which is fatal as the platform monitoring system.

For the reason set forth above, it has been a matter of technical common sense in the field of a platform monitoring system that light should be used, rather than radio waves, as a transmission medium for images representing situations on a platform, and that an increase in the cost and labor for the installation resulting from the employment of the multiplicity of light emitters 5a–5e must be regarded as acceptable.

JP-A-62-16636 discloses an optical space transmission device against a moving body, which is constituted of a plurality of optical transmitters installed on the ground side and an optical receiver installed on a moving body.

JP-A-11-331816 discloses a mobile body optical space transmission system, in which images representing a state on a platform are transmitted to a train by a ground side light transmission device and an on-vehicle side light receiving device.

JP-A-10-304346 discloses an ITV system for confirming safety, in which monitor video images at a station platform by two television cameras are synthesized into one image and the image is transmitted from the station platform to a train by a radio transmitter.

SUMMARY OF THE INVENTION

It is an object of the present invention to provide a platform monitoring system which, contrary to the technical common sense as mentioned above, is capable of reliably and appropriately monitoring as required for ensuring the safety for passengers, and is capable of operating with fewer light emitters, thereby reducing the cost and labor for installation thereof.

The results of studies made by the inventors have revealed the characteristics as described below in the platform monitoring system. Specifically, it is most important for ensuring the safety for passengers to monitor situations on a platform when a vehicle remains stopped at a predetermined stopping position with respect to the platform (i.e., when passengers are getting on and off). Therefore, when the vehicle remains stopped at the predetermined stopping position with respect to the platform, images representing situations on the platform must be transmitted to the vehicle side to display the situations without fail. Also, while the vehicle remains stopped at the platform, the operator and so on will be carefully watching images representing situations on the platform, so that the quality of the images are preferably higher. On the other hand, when the situations on the platform are monitored for continuing a safety check as to whether any passenger is caught by a door and dragged in a predetermined range of running immediately after the vehicle has been started from the platform, temporary disturbance on images representing situations on the platform, if any, would not cause any problem for the safety check. In addition, since the vehicle is running, the operator will view the images representing the situations on the platform while paying attentions to the front, i.e., the operator will not watch the images so carefully, the quality of the images may be relatively low for sufficiently accomplishing the purpose.

The present invention has been made by skillfully utilizing the aforementioned characteristics of the platform monitoring system found by the inventors.

Specifically, a platform monitoring system according to one aspect of the present invention comprises an imager device installed on the ground side for capturing a situation on a platform, a wireless transmission unit for transmitting an image captured by the imager device to a vehicle side, and a display unit installed on the vehicle side for displaying an image transmitted by the wireless transmission unit. The wireless transmission unit includes an optical transmitter installed on the ground side for transmitting an image captured by the imager device as an optical signal, a radio wave transmitter installed on the ground side for transmitting the image as a radio wave signal, an optical receiver installed on the vehicle side for receiving an optical signal transmitted from the optical transmitter, a radio wave receiver installed on the vehicle side for receiving a radio wave signal transmitted from the radio wave transmitter, and a selector for selecting one of the optical signal received by the optical receiver and the radio wave signal received by the radio wave receiver. The optical transmitter and the optical receiver are positioned such that a vehicle position range in which signal transmission through the optical signal can be achieved includes a region around a predetermined stopping position of the vehicle with respect to the platform. The radio wave transmitter and the radio wave receiver are positioned such that a vehicle position range in which signal transmission through the radio wave signal can be achieved includes a range from a region around the stopping position to a predetermined position behind the stopping position in a vehicle running direction. Then, an image represented by a signal selected by the selector is selectively displayed on the display unit.

According to this platform monitoring system, as transmission media for transmitting an image representing a situation on a platform captured by the imager device to the vehicle side, both radio waves and light waves are used, such that an image transmitted through one medium is selected by the selector and displayed on the display unit on the vehicle side. Then, the vehicle position range in which signal transmission through the optical signal can be achieved includes the region around the predetermined stopping position of the vehicle with respect to the platform, while the vehicle position range in which signal transmission through the radio wave signal can be achieved includes a range from the region around the predetermined stopping position of the vehicle with respect to the platform to a predetermined position behind the vehicle stopping position in the vehicle running direction.

Therefore, according to the foregoing platform monitoring system, for example, the selector may select an optically transmitted signal when the vehicle remains stopped at the predetermined stopping position, and select an image transmitted through any medium available for signal transmission, selected from the light and the radio waves, when the vehicle is positioned within a vehicle position range which extends from the stopping position to a predetermined position backward from the stopping position in the vehicle running direction. In this way, the situation on the platform can be appropriately monitored in accordance with the characteristics of the platform monitoring system.

Specifically, when the vehicle remains stopped at the predetermined stopping position, an optically transmitted image is displayed on the display unit in the vehicle. Since the optical transmission is free from noise due to multipath, the image representing the situation on the platform is reliably transmitted and displayed on the display unit on the vehicle side without fail.

On the other hand, when the vehicle is positioned within the vehicle position range which extends from the stopping position to the predetermined position backward from the stopping position in the vehicle running direction, an image transmitted through any medium available for signal transmission, selected from the light and the radio waves, is displayed on the display unit on the vehicle side. Therefore, as long as the vehicle is positioned within that range, the image transmitted through radio waves is displayed on the display unit on the vehicle side even if the vehicle is positioned within a range in which the optical transmission is disabled. As previously described, since the radio wave signal transmission is susceptible to noise due to multipath, the vehicle may happen to be at a position (hereinafter referred to as the "transmission disabled position") at which images available for monitoring for safety check cannot be displayed on the display unit depending on a nearby situation (existence of wall surfaces and other buildings). However, in the platform monitoring system of the present invention, since the image transmitted through radio waves is displayed on the display unit only when the vehicle lies other than the predetermined stopping position (i.e., while the vehicle is running), the vehicle passes over the transmission disabled position instantaneously so that the image displayed on the display unit merely experiences temporary disturbance. Thus, even within the predetermined range of running immediately after the vehicle has been started from the platform, a safety check can be appropriately continued as to whether or not any passenger is caught by a door and dragged.

Also, in the platform monitoring system, since the vehicle position range in which signal transmission through an optical signal can be achieved is only required to include the region around the predetermined stopping position of the vehicle with respect to the platform, the number of light emitters constituting the optical transmitter can be greatly reduced, thereby making it possible to reduce the cost and labor for the installation as the overall system even in consideration of the requirements for the radio wave transmitter and the radio wave receiver, as compared with the aforementioned conventional platform monitoring system. It should be noted that since radio waves tend to be less directive and therefore propagate over a wider range as compared with the light, the number of radio wave transmitters can be reduced irrespective of whether the track is curved, and little labor is required for installing the radio wave transmitter.

As described above, the platform monitoring system can appropriately perform the monitoring required for ensuring the safety for passengers without fail, and requires fewer light emitters to contribute to a reduction in the cost and labor for the installation.

The selector may be responsive to a transmission state of an optical signal between the optical transmitter and the optical receiver for selecting the optical signal when the optical signal presents a good transmission state, and the radio wave signal when the optical signal does not present the good transmission state. In this implementation, since one of the optical signal and the radio wave signal is selected in accordance with a good or a bad transmission condition of the optical signal, an optically transmitted image is selected when the vehicle remains stopped at the predetermined stopping position, while an image transmitted through any medium available for signal transmission is selected from the optical signal and the radio wave signal when the vehicle is positioned within the vehicle position range which extends from the stopping position to the predetermined position backward from the stopping position in the vehicle running direction.

Alternatively, the selector may include an optical signal level detector for detecting a level of an optical signal received by the optical receiver, wherein the selector may select the optical signal when a level detected by the optical signal level detector is equal to or higher than a predetermined level, and select the radio wave signal when the level detected by the optical signal level detector is lower than the predetermined level. In this implementation, the level of the optical signal received by the optical receiver is used as indicia of a transmission state of the optical signal between the optical transmitter and the optical receiver. Alternatively, data for detecting the transmission state may be added, for example, when an image is encoded, such that a determination as to whether or not the data can be decoded by the optical receiver may be used as indicia of the transmission state of the optical signal between the optical transmitter and the optical receiver.

Further alternatively, the selector may be responsive to the position of the vehicle for selecting the optical signal when the vehicle is positioned in the region around the stopping position, and the radio wave signal when the vehicle is positioned out of the region around the stopping position. Also, in this implementation, an optically transmitted image is selected when the vehicle remains stopped at the predetermined stopping position, while an image transmitted through any medium available for signal transmission is selected from the optical signal and the radio wave signal when the vehicle is positioned within the vehicle position range which extends from the stopping position to the predetermined position backward from the stopping position in the vehicle running direction.

When the position of the vehicle is utilized for the selection in the manner described above, a railway train or the like generally has a detector for detecting its own position, so that a position detection signal from the detector may be used for the selection. Alternatively, another position detector, for example, a GPS position detector or the like may be especially mounted in the vehicle, such that a position detection signal from this position detector may be used.

Further alternatively, the selector may be responsive to a transmission state of an optical signal between the optical transmitter and the optical receiver and a transmission state of a radio wave signal between the radio wave transmitter and the radio wave receiver for selecting (a) the optical signal when the optical signal presents a good transmission state, (b) the radio wave signal when the optical signal does not present the good transmission state and the radio wave signal presents a good transmission state, and (c) a stop of displaying an image represented by the optical signal or the radio wave signal when the optical signal does not present the good transmission state and the radio wave signal does not present the good transmission state. In this event, an image represented by the optical signal or the radio wave signal is not displayed on the display unit when the selector selects the stop of displaying. In this implementation, when the optical signal does not present a good transmission state and the radio wave signal also does not present a good transmission state, an image represented either by the optical signal or by the radio wave signal is not displayed on the display unit. Therefore, even if the platform monitoring system employs a circuit configured to hold and continuously output an image which can be received immediately before the radio wave signal cannot be received, it is possible to avoid a situation in which the most recently received image is continuously displayed although no radio wave signal is being received. In this respect, this implementation is preferable.

Further alternatively, the selector may include an optical signal level detector for detecting a level of an optical signal received by the optical receiver, and a radio wave signal level detector for detecting a level of a radio wave signal received by the radio wave receiver. In this implementation, the selector may select (a) the optical signal when a level detected by the optical signal level detector is equal to or higher than a first level, (b) the radio wave signal when the level detected by the optical signal level detector is lower than the first level and a level detected by the radio wave signal level detector is equal to or higher than a second level, and (c) a stop of displaying an image represented by the optical signal or the radio wave signal when the level detected by the optical signal level detector is lower than the first level and the level detected by the radio wave signal level detector is lower than the second level. In this event, an image represented by the optical signal or the radio wave signal is not displayed on the display unit when the selector selects the stop of displaying. In this implementation, the level of the optical signal received by the optical receiver is used as indicia of a transmission state of the optical signal between the optical transmitter and the optical receiver, while the level of the radio wave signal received by the radio wave receiver is used as indicia of a transmission state of the radio wave signal between the radio wave transmitter and the radio wave receiver. Alternatively, data for detecting the transmission state may be added, for example, when an image is encoded, such that a determination as to whether or not the data can be decoded by the optical receiver or by the radio wave receiver may be used as indicia of the transmission state of these signals.

Further alternatively, the selector may be responsive to a transmission state of an optical signal between the optical transmitter and the optical receiver and a transmission state of a radio wave signal between the radio wave transmitter and the radio wave receiver for selecting (a) the optical signal when the optical signal presents a good transmission state and the radio wave signal presents a good transmission state, (b) the radio wave signal when the optical signal does not present the good transmission state and the radio wave signal presents the good transmission state, and (c) a stop of displaying an image represented by the optical signal or the radio wave signal when the radio wave signal does not represent the good transmission state. In this event, an image represented by the optical signal or the radio wave signal is not displayed on the display unit when the selector selects the stop of displaying.

Further alternatively, the selector may include an optical signal level detector for detecting a level of an optical signal received by the optical receiver, and a radio wave signal level detector for detecting a level of a radio wave signal received by the radio wave receiver. In this implementation, the selector may select (a) the optical signal when a level detected by the optical signal level detector is equal to or higher than a first level and a level detected by the radio wave signal level detector is equal to or higher than a second level, (b) the radio wave signal when the level detected by the optical signal level detector is lower than the first level and the level detected by the radio wave signal level detector is equal to or higher than the second level; and (c) a stop of displaying an image represented by the optical signal or the radio wave signal when the level detected by the radio wave signal level detector is lower than the second level. In this event, an image represented by the optical signal or the radio wave signal is not displayed on the display unit when the selector selects the stop of displaying.

Further alternatively, the selector may be responsive to a position of the vehicle and a transmission state of a radio wave signal between the radio wave transmitter and the radio wave receiver for selecting (a) the optical signal when the vehicle is positioned in the region around the stopping position, (b) the radio wave signal when the vehicle is positioned out of the region around the stopping position and the radio wave signal presents a good transmission state, and (c) a stop of displaying an image represented by the optical signal or the radio wave signal when the vehicle is positioned out of the region around the stopping position and the radio wave signal does not present the good transmission state. In this event, an image represented by the optical signal or the radio wave signal is not displayed on the display unit when the selector selects the stop of displaying.

Further alternatively, the selector may include a radio wave signal level detector for detecting a level of a radio wave signal received by the radio wave receiver. In this implementation, the selector may select (a) the optical signal when the vehicle is positioned in the region around the stopping position, (b) the radio wave signal when the vehicle is positioned out of the region around the stopping position and a level detected by the radio wave signal level detector is equal to or higher than a predetermined level, and (c) a stop of displaying an image represented by the optical signal and the radio wave signal when the vehicle is positioned out of the region around the stopping position and the level detected by the radio wave signal level detector is lower than the predetermined level. In this event, an image represented by the optical signal or the radio wave signal is not displayed on the display unit when the selector selects the stop of displaying.

Further alternatively, the selector may be responsive to the position of the vehicle for selecting (a) the optical signal when the vehicle is positioned in the region around the stopping position, (b) the radio wave signal when the vehicle is positioned out of the region around the stopping position and the vehicle positioned in the range from the region around the stopping position to the predetermined position behind the stopping position in the vehicle running direction, and (c) a stop of displaying an image represented by the optical signal or the radio wave signal when the vehicle is positioned out of the region around the stopping position and the vehicle is positioned out of the range from the region around the stopping position to the predetermined position behind the stopping position in the vehicle running direction. In this event, an image represented by the optical signal or the radio wave signal is not displayed on the display unit when the selector selects the stop of displaying.

An image transmitted through the optical signal may have a quality higher than an image transmitted through the radio wave signal. The optical signal transmission speed is higher than the radio wave signal transmission speed. Therefore, an image transmitted through an optical signal preferably has a higher quality than an image transmitted through the radio wave signal since the image carefully watched by the operator while the vehicle remains stopped at the platform presents a high image quality. It should be noted that the radio wave signal transmission speed is relatively low, so that an image transmitted through a radio wave signal cannot provide a very high quality. Nevertheless, such an image quality serves sufficiently for a safety check. In addition, since the image transmitted through the radio wave signal is displayed on the display unit when the vehicle is found at a position other than the predetermined stopping position (i.e., the vehicle is running), the operator will view the image representing a situation on the platform while paying attention to the front, i.e., the operator will not watch the image so carefully. For this reason, the quality of the image may be relatively low for sufficiently accomplishing the purpose.

Alternatively, the quality of an image transmitted through an optical signal may be identical to the quality of an image transmitted through the radio wave signal. In this implementation, an image encoder circuit for optical transmission and an image encoder circuit for radio wave transmission can be replaced with a single encoder circuit.

DESCRIPTION OF THE PREFERRED EMBODIMENTS

In the following, a platform monitoring system according to the present invention will be described with reference to the accompanying drawings.

First, the platform monitoring system according to a first embodiment of the present invention will be described with reference to FIGS. 1 to 3.

Figure 1:
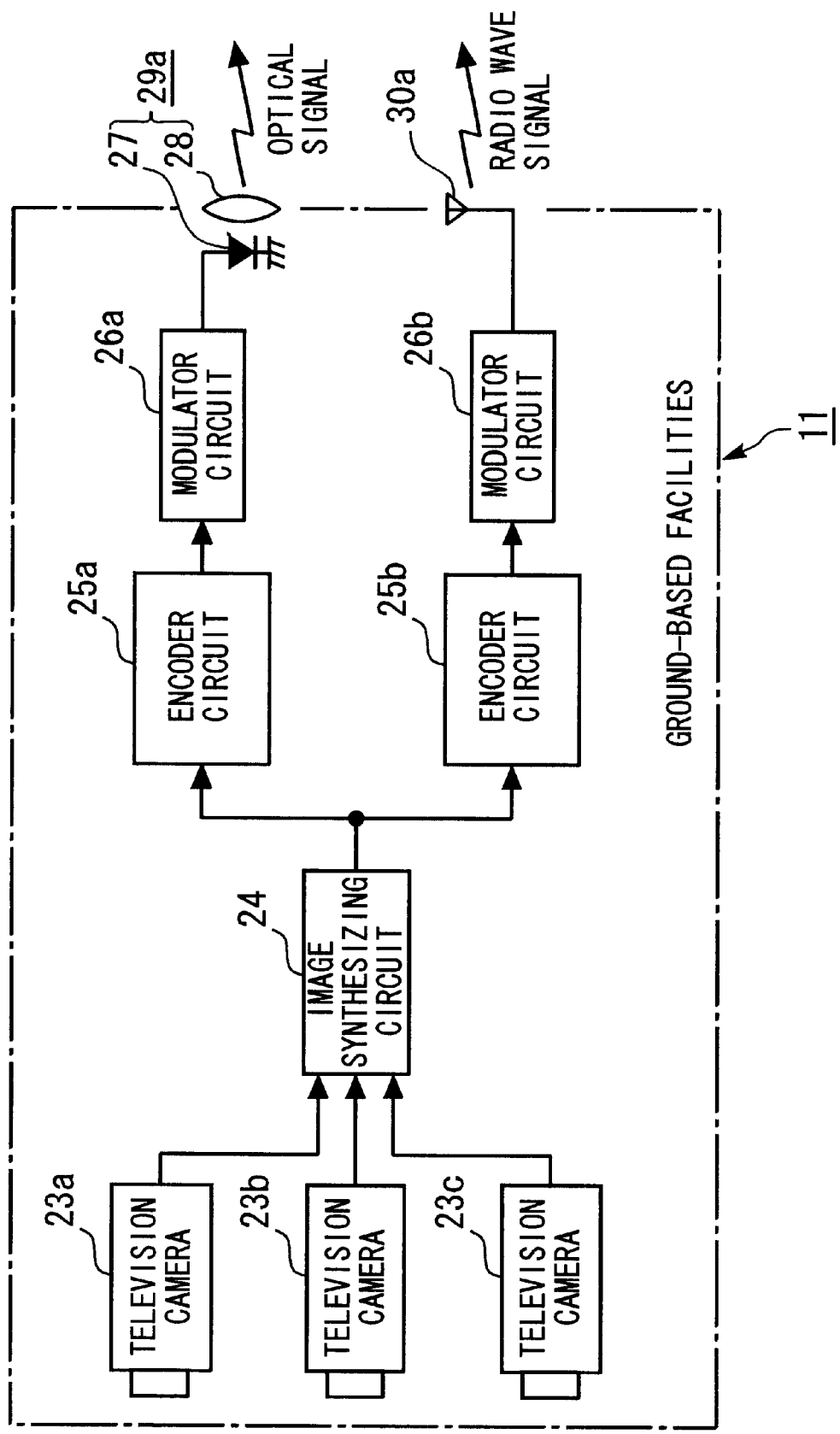
FIG. 1 is a block diagram generally illustrating ground-based facilities included in a platform monitoring system according to a first embodiment of the present invention.

FIG. 1 is a block diagram generally illustrating ground-based facilities 11 for an up line, which constitutes the platform monitoring system according to the first embodiment, and is installed on the ground side. FIG. 2 is a block diagram generally illustrating vehicle-based facilities 12 for the up line, which constitutes the platform monitoring system according to the first embodiment, and is installed in the vehicle 20. FIG. 3 is a schematic plan view generally illustrating exemplary positioning for some components of the platform monitoring system according to the first embodiment.

Figure 3:
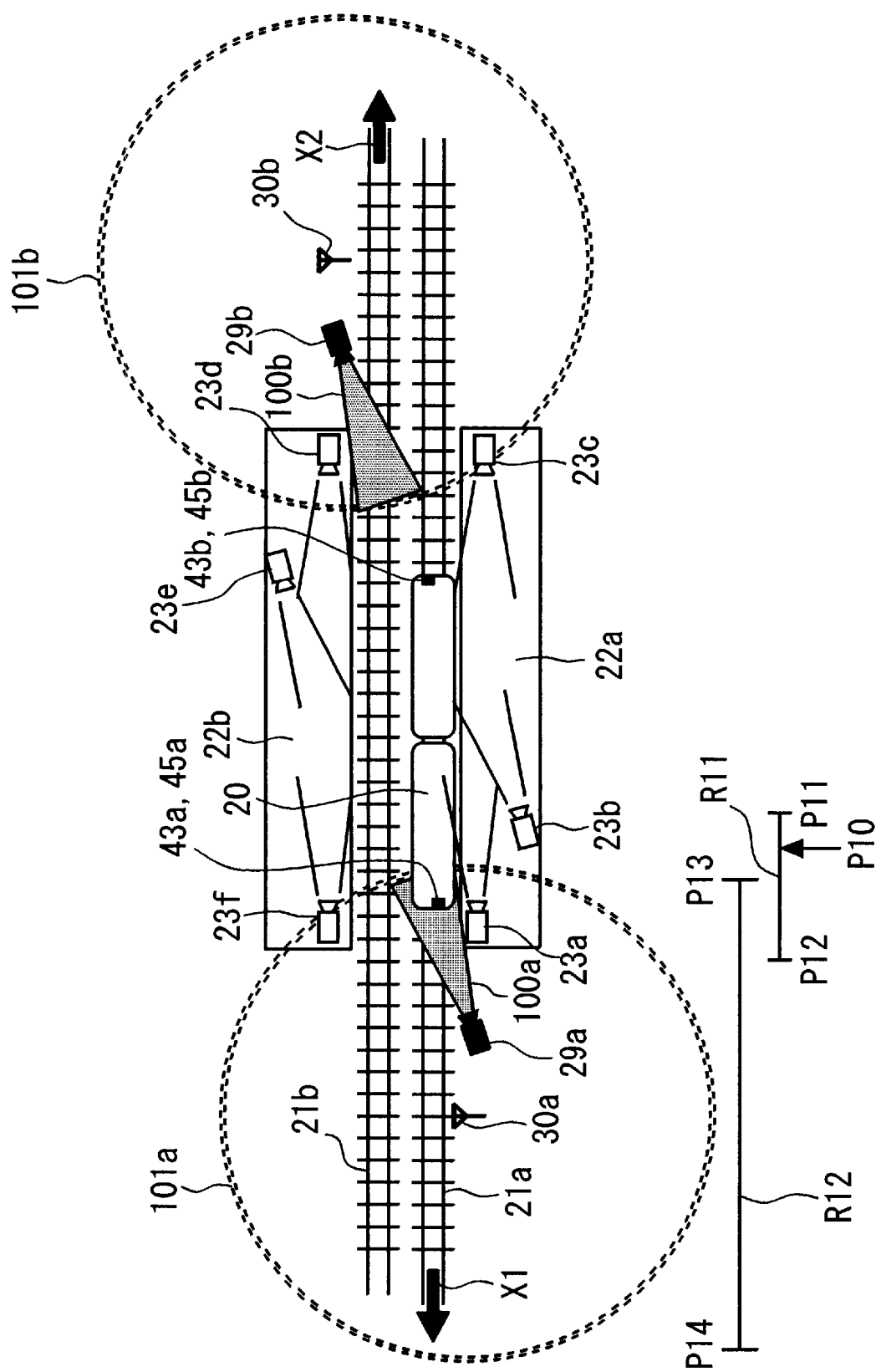
FIG. 3 is a schematic plan view generally illustrating exemplary positioning of some components of the platform monitoring system according to the first embodiment of the present invention.

In FIG. 3, reference numeral 21a designates a track as an up line track; 21b, a down line track; 20, a vehicle which runs on the tracks 21a, 21b as an up line train and a down line train (in FIG. 3, the up line train is shown); 22a, an up line platform; and 22b, a down line platform. Also, an arrow X1 indicates an up line running direction of the vehicle 20, and an arrow X2 indicates a down line running direction of the vehicle 20.

The ground-based facilities 11 for the up line, as illustrated in FIGS. 1 and 3, comprise three (or an arbitrary number equal to or larger than one) television cameras 23a–23c as imager device for imaging situations on the up line platform 22a; an image synthesizing circuit 24 for synthesizing respective image signals from the cameras 23a–23c into an image signal which represents a single synthesized image in which the respective images are arranged in a certain format; encoder circuits 25a, 25b for A/D converting the image signal (a moving image signal) from the image synthesizing circuit 24 and encoding the A/D converted image signal; a light emitting element 27 such as LED; an optical system 28 for outputting an optical signal emitted from the light emitting element 27 (for example, an infrared signal) to the outside; a modulator circuit 26a for driving the light emitting element 27 to perform a modulation such as FSK in accordance with data encoded by the encoder circuit 25a; a radio wave transmission antenna 30a; and a modulator circuit 26b for driving the antenna 30a to perform a modulation such as spread spectrum modulation in accordance with data encoded by the encoder circuit 25b. The light emitting element 27 and the optical system 28 constitute a light emitter 29a for delivering an optical signal.

The encoder circuit 25a performs information source encoding (data compression) for A/D converted moving image data, and communication path encoding such as error correction encoding for compressed data and so on, and may be comprised of a DSP (Digital Signal Processor), a buffer memory, another memory or the like. A variety of schemes may be employed for the compression, and the present invention may employ processes relying on algorithms including, for example, interframe prediction, DCT-based block conversion, quantization and so on, as is well known in the art. While the encoder circuit 25b is configured similarly to the encoder circuit 25a, the encoder circuit 25a has a compression ratio, used in the data compression, smaller than that of the encoder circuit 25b. With such settings, the quality of images transmitted through optical signals emitted from the light emitter 29a is higher than the quality of images transmitted through radio wave signals propagated from the antenna 30a.

As is understood from the foregoing description, the encoder circuit 25a, modulator circuit 26a and light emitter 29a constitute an optical transmitter for transmitting images captured by the cameras 23a–23c as optical signals. On the other hand, the encoder circuit 25b, modulator circuit 26b and antenna 30a constitute a radio wave transmitter for transmitting the same images captured by the cameras 23a–23c as radio wave signals.

Ground-based facilities for the down line, though not shown, are configured in a similar manner to the aforementioned ground-based facilities 11 for the up line. It should be noted that different carrier frequencies, for example, are allocated to the up line and the down line, respectively, to prevent radio waves from the ground-based facilities 11 for the up line from interfering with radio waves from the ground-based facilities for the down line. FIG. 3 illustrates, among components of the ground-based facilities for the down line, television cameras 23d–23f, a light emitter 29b, and a radio wave transmission antenna 30b which correspond to the television cameras 23a–23c, light emitter 29a, and radio wave transmission antenna 30a in the ground-based facilities 11 for the up line, respectively.

Figure 2:
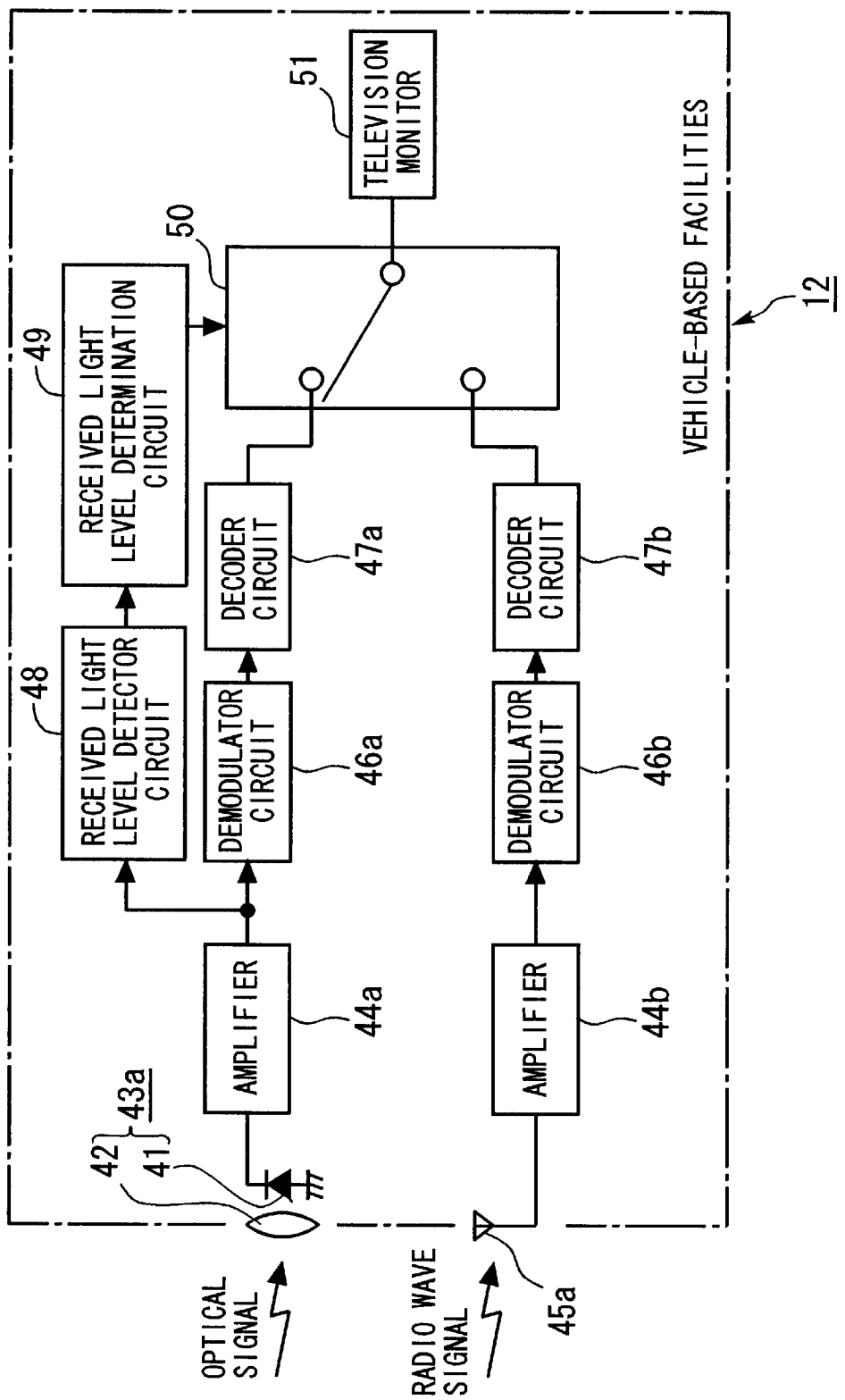
FIG. 2 is a block diagram generally illustrating vehicle-based facilities included in the platform monitoring system according to the first embodiment of the present invention.

As illustrated in FIGS. 2 and 3, the vehicle-based facilities 12 for the up line comprises a light receiving element 41 such as a photodiode for receiving an optical signal transmitted from the light emitter 29a of the ground-based facilities 11 for the up line; an optical system 42 for guiding the optical signal transmitted from the light emitter 29a to the light receiving element 41; an amplifier 44a for amplifying an output which has been opto-electrically transduced by the light receiving element 41; a radio wave reception antenna 45a for receiving radio waves transmitted from the antenna 30a of the ground-based facilities 11 for the up line; an amplifier 44b for amplifying a signal received by the antenna 45a; demodulator circuits 46a, 46b for demodulating signals amplified by the amplifiers 44a, 44b, respectively; decoder circuits 47a, 47b for decoding data demodulated by the demodulator circuits 46a, 46b, respectively, to original moving image data, and D/A converting the decoded data as required to recover image signals; a received light level detector circuit 48 for detecting a received light level of a received optical signal based on the output of the amplifier 44a (i.e., intensity of the optical signal (particularly, its carrier)); a received light level determination circuit 49 for determining whether or not the received light level exceeds a first predetermined threshold based on a detection signal from the received light level detector circuit 48; a switch 50; and a television monitor 51 as a display unit. The television monitor 51 is installed near an operator's seat at a leading end of the vehicle 20 when it is running in the up line direction. The light receiving element 41 and the optical system 42 constitute a light receiver 43a.

The first threshold is set as indicated in FIG. 3 such that the received light level is equal to or higher than the first threshold when the light receiver 43a is positioned within an area 100a in which an optical signal can be transmitted between the light receiver 43a and the light emitter 29a, and the received light level is lower than the first threshold when the light receiver 43a is not positioned within the area 100a. The switch 50 is responsive to a determination result signal from the received light level determination circuit 49 to selectively connect an image signal (image signal transmitted through an optical signal) from the decoder circuit 47a to the television monitor 51 when the received light level is equal to or higher than the first threshold, and selectively connect an image signal (image signal transmitted through a radio wave signal) from the decoder circuit 47b to the television monitor 51 when the received light level is lower than the first threshold. The determination as to whether the received light level is equal to or higher than the first threshold is comparable to a determination as to whether or not a transmission state between the light receiver 43a and the light emitter 29a through an optical signal is satisfactory (or good).

As is understood from the foregoing description, in the first embodiment, the received light level detector circuit 48, received light level determination circuit 49 and switch 50 constitute a selector for selecting one of an image signal transmitted through an optical signal and an image signal transmitted through a radio wave signal, such that a resulting image represented by a selected image signal is displayed on the monitor 51.

As described above, in the first embodiment, since images respectively captured by the cameras 23a–23c are synthesized into a single image by the image synthesizing circuit 24 in the ground-based facilities 11, the images respectively captured by the cameras 23a–23c are displayed in associated regions of a screen on the single monitor 51. However, the images need not be synthesized by the image synthesizing circuit 24. Alternatively, for example, images respectively captured by the cameras 23a–23c may be encoded by encoder circuits respectively corresponding to the cameras 23a–23c, and multiplexed separately for the optical signal and the radio wave signal, using an optical signal multiplexer circuit and a radio wave signal multiplexer circuit. Then, in the vehicle-based facilities 12, the outputs of the demodulator circuits 46a, 46b are respectively demultiplexed to images captured by the respective cameras using demultiplexer circuits. The demultiplexed data is decoded respectively by corresponding decoder circuits. Then, the image captured by each camera is switched by a corresponding switch between an image signal transmitted through an optical signal and an image signal transmitted through a radio wave signal, so that the images captured by the respective cameras are displayed on a plurality of television monitors corresponding thereto.

Though not shown in the drawings, the vehicle-based facilities for the down line are configured in a similar manner to the aforementioned vehicle-based facilities 12 for the up line, and installed in the vehicle 20. This is because the vehicle 20 serves as an up line train which runs on the track 21a in the X1 direction as well as a down line train which runs on the track 21b in the X2 direction. FIG. 3 illustrates, among components of the vehicle-based facilities for the down line, a light receiver 43b and a radio wave reception antenna 45b which correspond to the light receiver 43a and the radio wave reception antenna 45a in the vehicle-based facilities 12 for the up line.

Next, the positioning of components involved in the transmission of image signals from the ground side to the vehicle side will be described with reference to FIG. 3. In FIG. 3, reference numeral 100a designates an area in which an optical signal can be transmitted between the light receiver 43a and the light emitter 29a, as mentioned above, while 101a designates an area in which a radio wave signal can be transmitted between the transmission antenna 30b and the reception antenna 45b. Since the positioning of components for the up line is similar to the positioning of components for the down line, only the positioning of the components for the up line will be described below.

In FIG. 3, the position of the vehicle 20 is indicated as the position of the leading end of the vehicle 20 when it is running in the up line direction for convenience of explanation. Since the track 21a extends in the horizontal direction in the figure, vehicle positions P10-P14 in the figure are indicated at positions in the horizontal direction in the figure. Position P10 indicates a predetermined stopping position of the vehicle 20 with respect to the platform 22a. A range R11, which extends from position P11 to position P12, indicates a range of vehicle position in which the light receiver 43a is positioned in the area 100a. A range R12, which extends from position P13 to position P14, indicates a range of vehicle position in which the reception antenna 45a is positioned in the area 101a.

In the first embodiment, as shown in FIG. 3, position P11 is defined at a position slightly in front of (on the right side in FIG. 3) stopping position P10 in the vehicle running direction (X1 direction), while position P12 is defined at a position slightly behind (on the left side in FIG. 3) stopping position P10 in the vehicle running direction (X1 direction). With the foregoing positioning, the light emitter 29a and the light receiver 43a are disposed such that a region around stopping position P10 is included in the vehicle position range R11 in which an optical signal can be transmitted between the light emitter 29a and the light receiver 43a.

Also, in the first embodiment, as shown in FIG. 3, position P13 is defined at a position slightly behind (on the left side in FIG. 3) stopping position P10 in the vehicle running direction (X1 direction), while position P14 is defined at a predetermined position behind (on the left side in FIG. 3) stopping position P10 in the vehicle running direction. Then, the transmission antenna 30a and the reception antenna 45a are disposed such that the vehicle position range R12, in which a radio wave signal can be transmitted between the transmission antenna 30a and the reception antenna 45a, includes a range extending from a region around stopping position P10 to predetermined position P14 behind (on the left side in FIG. 3) stopping position P10 in the vehicle running direction. Position P14 is set in accordance with the length of the vehicle 20, and a distance over which a continuous safety check is desired for checking whether or not any passenger is caught by a door and dragged after the vehicle 20 has been started from the platform 22a.

Next, the operation of the platform monitoring system according to the first embodiment will be described for an example in which the vehicle 20 runs on the track 21a in the up line direction (X1 direction). Since the operation in the down line is similar to that in the up line, description thereof is omitted.

Before the vehicle 20 reaches position P11, the transmission through an optical signal (hereinafter referred to as the "optical signal transmission") between the light emitter 29a and the light receiver 43a as well as the transmission through a radio wave signal (hereinafter referred to as the "radio wave signal transmission") between the transmission antenna 30a and the reception antenna 45a are disabled, so that no image representing situations on the platform 22a is displayed on the monitor 51 near the operator's seat. Also, in this event, since the received light level of the light receiver 43a is lower than the first threshold, the switch 50 connects the output of the decoder circuit 47b associated with the radio wave signal transmission to the television monitor 51.

Subsequently, as the vehicle 20 reaches position P11, the received light level of the light receiver 43a becomes higher than the first threshold, causing the switch 50 to connect the output of the decoder circuit 47a associated with the optical signal transmission to the television monitor 51. Also, in this event, since the vehicle 20 is positioned within the vehicle position range R11 in which the optical signal transmission is available, the optical signal transmission is appropriately accomplished to display a high quality image representing situations on the platform 22a, through the optical signal transmission, on the monitor 51 on the side of the vehicle 20.

The above state continues until the vehicle 20 passes over position P12. As the vehicle 20 reaches stopping position P10, the vehicle 20 is stopped and doors of the vehicle 20 are opened for passengers to get on and off the vehicle 20. In this event, the operator can carefully watch the monitor 51 to monitor situations on the platform 22a and make a safety check as to whether any passenger is caught by a door of the vehicle 20.

Subsequently, as the vehicle 20 is started, runs and passes over position P12, the received light level of the light receiver 43a becomes lower than the first threshold, causing the switch 50 to connect the output of the decoder circuit 47b associated with the radio wave signal transmission to the television monitor 51. In this event, since the vehicle 20 is positioned within the vehicle position range R12 in which the radio wave signal transmission is available, the radio wave signal transmission is appropriately accomplished to display an image of relatively low quality, representing situations on the platform 22a, through the optical signal transmission, on the monitor 51 in the vehicle 20. In this way, the image displayed on the monitor 51 is automatically switched from the image provided through the optical signal transmission to the image provided through the radio wave signal transmission at position P12, so that the image of the same contents, representing the situations on the platform 22a is continuously displayed on the monitor 51, though the image quality is lower. Therefore, the operator can continuously view the monitor 51 to continue a safety check as to whether any passenger is caught by a door and dragged, even when the vehicle 20 is running immediately after the start.

This state is continued until the vehicle 20 passes over position P14. As the vehicle 20 passes over position P14, the radio wave signal transmission is also disabled, so that no image representing the situations on the platform 22a is displayed on the monitor 51.

As described above, according to the first embodiment, when the vehicle 20 remains stopped at the stopping position P10, an optically transmitted image is displayed on the monitor 51 in the vehicle 20. Since the optical transmission is free from noise due to multipath, the image representing situations on the platform 22a is reliably transmitted and displayed on the monitor 51 in the vehicle 20 without fail.

On the other hand, when the vehicle 20 is positioned within the vehicle position range extending from stopping position P10 to position P14, an image transmitted through any available medium of an optical signal or a radio wave signal is displayed on the monitor 51 in the vehicle 20. Therefore, as long as the vehicle 20 is positioned in that range, an image transmitted through a radio wave signal is displayed on the monitor 51 even if the vehicle is positioned within a range (extending from position P12 to position P14) in which the optical transmission is disabled. With the radio wave signal transmission, which is susceptible to noise due to multipath, the vehicle 20 may be located at a position (hereinafter referred to as the "transmission disabled position") at which images available for monitoring for a safety check cannot be displayed on the display means depending on a nearby situation (existence of wall surfaces and other buildings). However, in the first embodiment, since the image transmitted through radio waves is displayed on the monitor 51 only when the vehicle 20 is positioned within a range from position P12 to position P14 (i.e., while the vehicle 20 is running), the vehicle 20 passes the transmission disabled position instantaneously so that the image displayed on the monitor 51 merely experiences temporary disturbance. Thus, even within a predetermined range (from position P10 to position P14) of running immediately after the vehicle 20 has been started from the platform 22a, a safety check can be appropriately continued as to whether any passenger is caught by a door and dragged.

Further, since the first embodiment employs only one light emitter 29a, a reduction in the cost and labor for the installation can be achieved as the overall system even in consideration of the requirements for the radio wave transmitter and radio wave receiver, as compared with the conventional platform monitoring system which requires a multiplicity of light emitters. It should be noted that since radio waves tend to be less directive and therefore propagate over a wider range as compared with the light, the number of transmitters can be reduced irrespective of whether the track 21a is curved, and little labor is required for installing the transmission antenna 30a.

As described above, the platform monitoring system according to the first embodiment can appropriately perform the monitoring required for ensuring the safety for passengers without fail, and requires a less number of light emitters to contribute to a reduction in the cost and labor for the installation.

Figure 6:
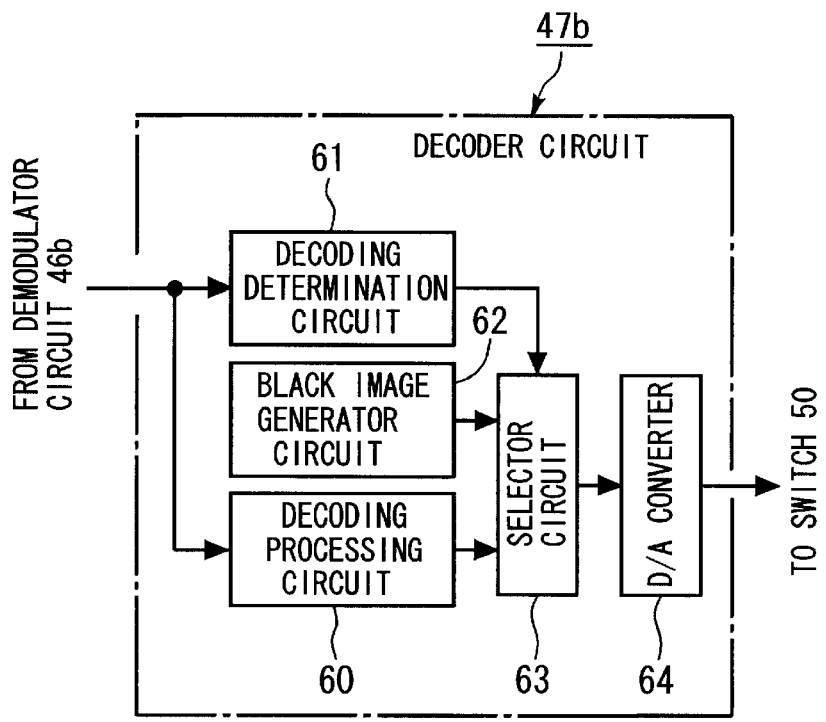
FIG. 6 is a block diagram generally illustrating an exemplary configuration of a decoder circuit in FIG. 2.
Figure 7:
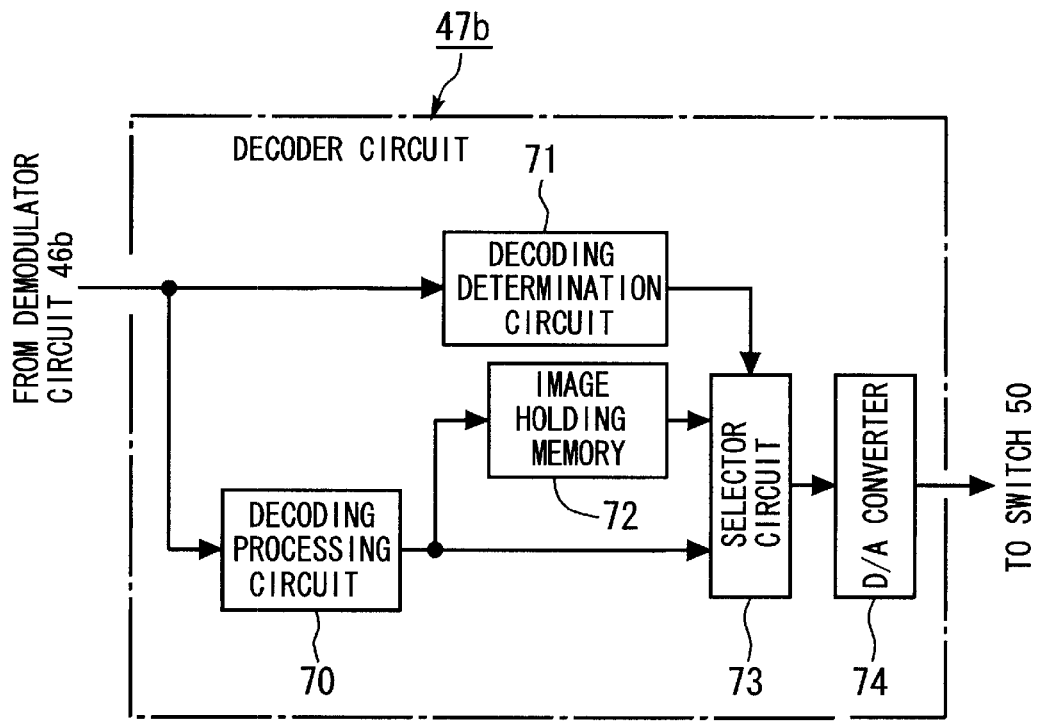
FIG. 7 is a block diagram generally illustrating another exemplary configuration of the decoder circuit in FIG. 2.

The decoder circuit 47b in FIG. 2 may have the configuration illustrated in FIG. 6 or the configuration illustrated in FIG. 7.

In the configuration of FIG. 6, the decoder circuit 47b comprises a decoding processing circuit 60, a decoding determination circuit 61, a black image generator circuit 62, a selector circuit 63, and a D/A converter 64. The decoding processing circuit 60 decodes data demodulated by the demodulator circuit 46b to original moving image data. The decoding determination circuit 61 determines whether or not data demodulated by the demodulator circuit 46b can be decoded. The black image generator circuit 62 generates black image data for painting out the entire screen of the monitor 51 in black. The selector circuit 63 is responsive to the result of the determination made by the decoding determination circuit 61 for selectively outputting moving image data decoded by the decoding processing circuit 60 to the D/A converter 64, when the data can be decoded, and the black image data from the black image generator circuit 62 to the D/A converter 64 when the data cannot be decoded. The D/A converter 64 converts the moving image data or the black image data outputted from the selector circuit 63 and supplies the resulting data to the switch 50.

In the first embodiment, when the configuration illustrated in FIG. 6 is employed for the decoder circuit 47b, the entire screen of the television monitor 51 is painted out in black to display nothing, after the vehicle 20 has passed over, for example, position P14 in FIG. 3. Therefore, the configuration illustrated in FIG. 6 is preferable since the image displayed on the television monitor 51 represents current situations at all times.

In the configuration of FIG. 7, the decoder circuit 47b comprises a decoding processing circuit 70, a decoding determination circuit 71, a memory 72 for holding an image, a selector circuit 73, and a D/A converter 74. The decoding processing circuit 70 decodes data demodulated by the demodulator circuit 46b to original moving image data. The decoding determination circuit 71 determines whether or not data demodulated by the demodulator circuit 46b can be decoded. The memory 72 holds image data representing a single image, most recently decoded by the decoding processing circuit 70. The selector circuit 73 is responsive to the result of the determination made by the decoding determination circuit 71 for selectively outputting moving image data decoded by the decoding processing circuit 70 to the D/A converter 74 when the data can be decoded, and image data held in the memory 72 (the most recently decoded image data) to the D/A converter 74 when the data cannot be decoded. The D/A converter 74 converts the moving image data or the most recent image data outputted from the selector 73, and supplies the resulting data to the switch 50.

In the first embodiment, when the configuration illustrated in FIG. 7 is employed for the decoder circuit 47b, the most recently decoded image is continuously displayed on the television monitor 51, after the vehicle 20 has passed over, for example, position P14 in FIG. 3. Even in this case, no particular hindrance would be caused. However, after the vehicle 20 has passed over, for example, position P14 in FIG. 3, the image, which is not required for a safety check, is continuously displayed. For this reason, in the first embodiment, the configuration illustrated in FIG. 6 is preferably employed for the decoder circuit 47b rather than the configuration illustrated in FIG. 7.

Next, a platform monitoring system according to a second embodiment of the present invention will be described with reference to FIG. 4.

Figure 4:
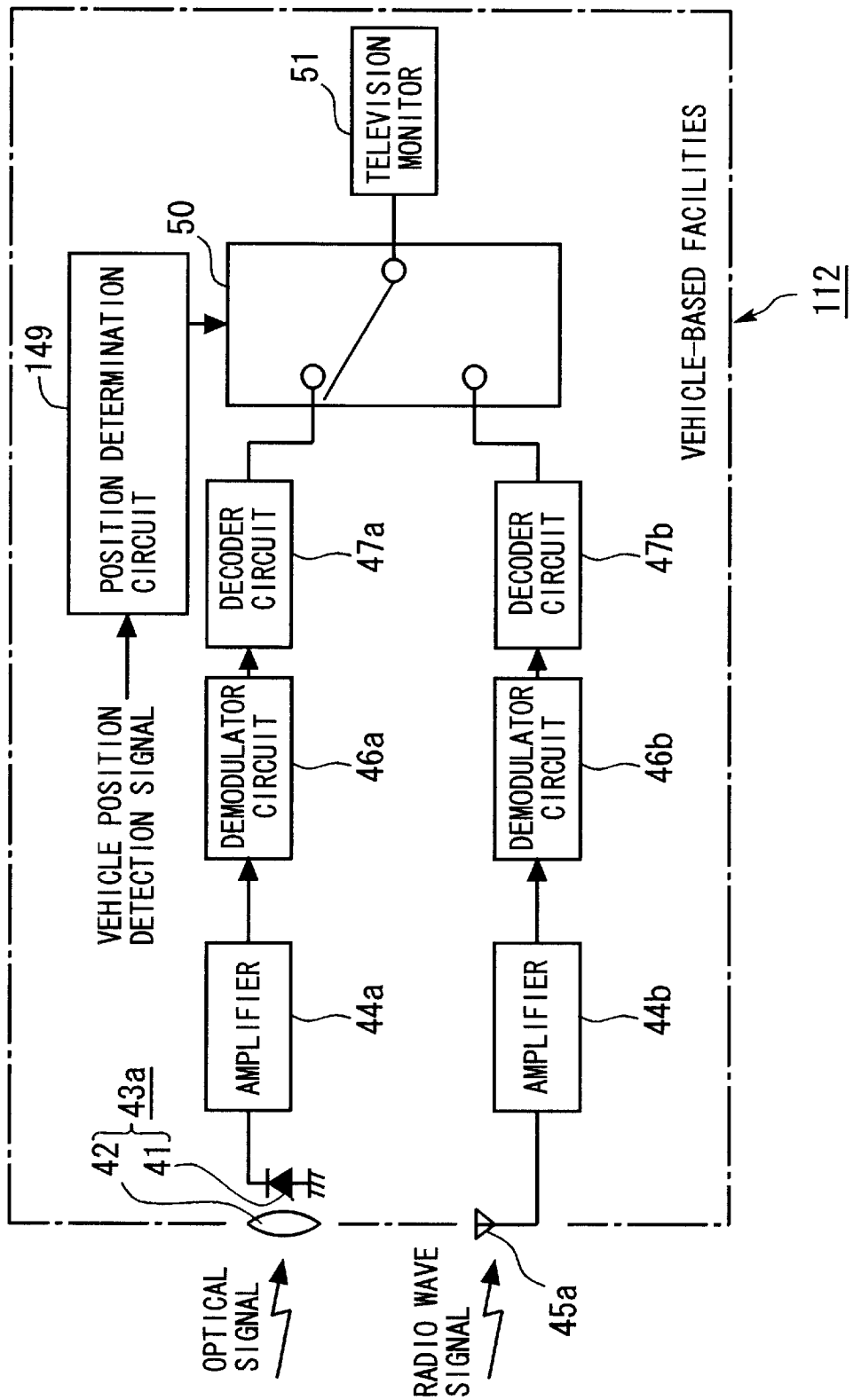
FIG. 4 is a block diagram generally illustrating vehicle-based facilities included in a platform monitoring system according to a second embodiment of the present invention.
Figure 5:
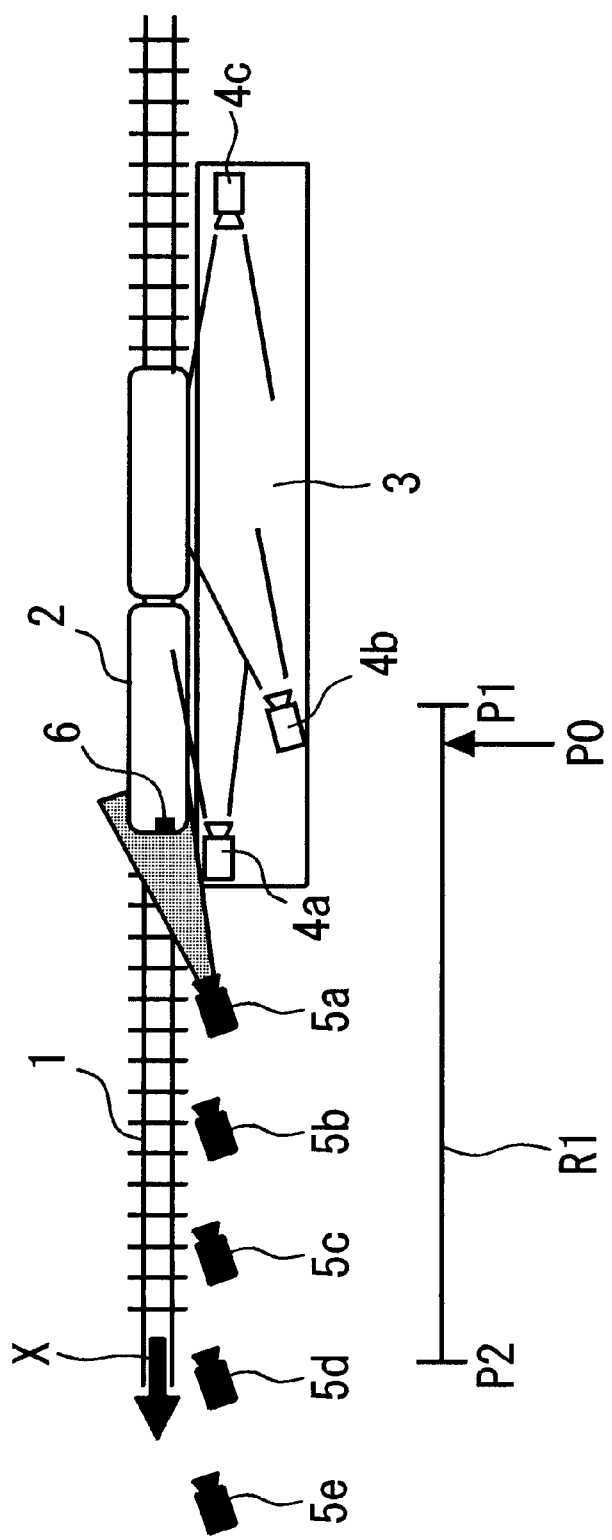
FIG. 5 is a schematic plan view generally illustrating exemplary positioning of some components of the platform monitoring system in a conventional platform monitoring system.

FIG. 4 is a block diagram generally illustrating vehicle-based facilities 112 for the up line, which constitute the platform monitoring system according to the second embodiment and are installed on the side of a vehicle 20. In FIG. 4, components identical or corresponding to those in FIG. 2 are designated the same reference numerals, and repetitive description is omitted.

The second embodiment differs from the first embodiment only in that the vehicle-based facilities 112 for the up line illustrated in FIG. 4 are used in place of the vehicle-based facilities 12 for the up line illustrated in FIG. 2, and that vehicle-based facilities for the down line are changed as well in a similar manner. In addition, the vehicle-based facilities 112 differs from the vehicle-based facilities 12 illustrated in FIG. 2 only in that the received light level detector circuit 48 is removed, with a position determination circuit 149 employed in place of the received light level determination circuit 49. The position determination circuit 149 receives a position detection signal from a position detector (not shown) inherently mounted on the vehicle 20 for detecting the position of the vehicle 20, and determines whether or not the vehicle 20 is positioned within the range R11 shown in FIG. 3 based on the position detection signal. Also, in the second embodiment, a switch 50 is responsive to a determination result signal from the position determination circuit 149 to selectively connect an image signal from a decoder circuit 47a (image signal transmitted through an optical signal) to a television monitor 51 when the vehicle 20 is positioned within the range R11, and to selectively connect an image signal from a decoder circuit 47b (image signal transmitted through a radio wave signal) to the television monitor 51 when the vehicle 20 is not positioned within the range R11.

The second embodiment also provides similar advantages to those of the aforementioned first embodiment. Alternatively, as a position detector for detecting the position of the vehicle 20, a GPS position detector or the like may be especially mounted in the vehicle 20, such that the position determination circuit 149 uses a position detection signal from the position detector.

In the second embodiment, the decoder circuit 47b in FIG. 4 may have the configuration illustrated, for example, in FIG. 6, or alternatively the configuration illustrated in FIG. 7.

Next, a platform monitoring system according to a third embodiment of the present invention will be described with reference to FIG. 8.

Figure 8:
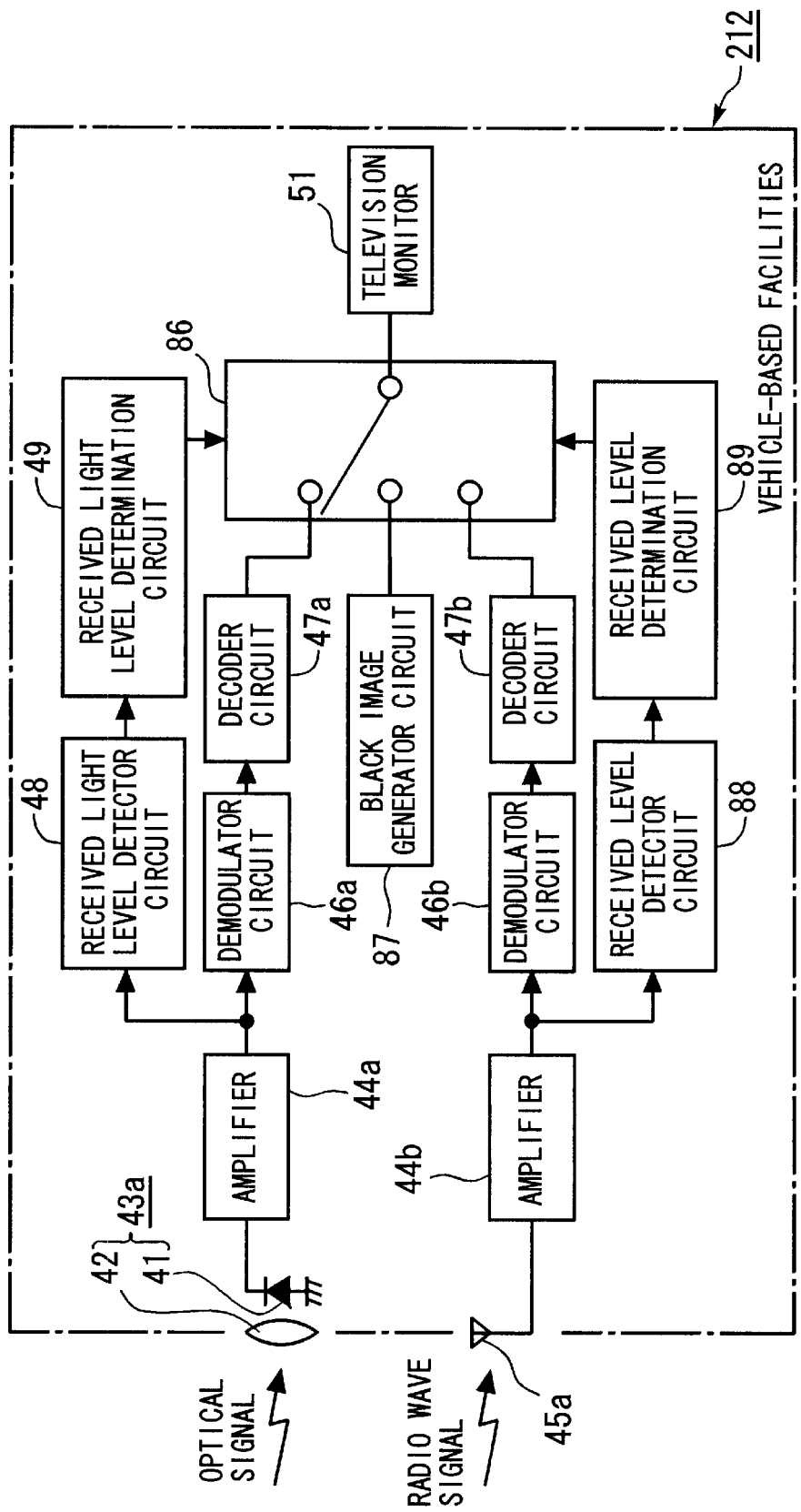
FIG. 8 is a block diagram generally illustrating vehicle-based facilities included in a platform monitoring system according to a third embodiment of the present invention.

FIG. 8 is a block diagram generally illustrating vehicle-based facilities 212 for the up line, which constitute the platform monitoring system according to the third embodiment and are installed in a vehicle 20. In FIG. 8, components identical or corresponding to those in FIG. 2 are designated the same reference numerals, and repetitive description is omitted.

The third embodiment differs from the first embodiment only in that the vehicle-based facilities 212 for the up line illustrated in FIG. 8 are used in place of the vehicle-based facilities 12 for the up line illustrated in FIG. 2, and that vehicle-based facilities for the down line are changed as well in a similar manner. In addition, the vehicle-based facilities 212 differs from the vehicle-based facilities 12 illustrated in FIG. 2 only in that a switch 86 is used in place of the switch 50, and that a black image generator circuit 87, a received level detector circuit 88 and a received level determination circuit 89 are added.

The black image generator circuit 87 generates black image data for painting out the entire screen of a television monitor 51 in black.

The received level detector circuit 88 detects a received level of a received radio wave signal (particularly, the intensity of a carrier of the radio wave signal) based on an output of an amplifier 44b. The received level determination circuit 89 determines whether or not the received level exceeds a predetermined second threshold based on a detection signal from the received level detector circuit 88. Describing with reference to FIG. 3, in the third embodiment, the second threshold is basically set such that the received level is equal to or higher than the second threshold when a radio wave reception antenna 45a is positioned within the area 101a in which a radio wave signal can be transmitted between a radio wave transmission antenna 30a and the radio wave reception antenna 45a, and the received level is lower than the second threshold when the radio wave reception antenna 45a is not positioned within the area 101a.

The switch 86 is responsive to a determination result signal from a received light level determination circuit 49 and a determination result signal from the received level determination circuit 89 to (a) selectively connect an image signal from a decoder circuit 47a (image signal transmitted through an optical signal) to the television monitor 51 when the received light level is equal to or higher than the first threshold; (b) selectively connect an image signal from a decoder circuit 47b (image signal transmitted through a radio wave signal) when the received light level is lower than the first threshold and the received level is equal to or higher than the second threshold; and (c) selectively connect the black image data from the black image generator circuit 87 to the television monitor 51 when the received light level is lower than the first threshold and the received level is lower than the second threshold. The determination as to whether or not the received light level is equal to or higher than the first threshold is comparable to a determination as to whether or not a transmission state between a light receiver 43a and a light emitter 29a through an optical signal is satisfactory. The determination as to whether or not the received signal is equal to or higher than the second threshold is comparable to a determination as to whether or not the transmission between the radio wave transmission antenna 30a and the radio wave reception antenna 45a through a radio wave signal is satisfactory.

As is understood from the foregoing description, in the third embodiment, the detector circuits 48, 88, determination circuits 49, 89, and switch 86 constitute a selector for selecting one of an image signal transmitted through an optical signal and an image signal transmitted through a radio wave signal, such that an image represented by a selected image signal is displayed on the monitor 51. In the third embodiment, due to the operation of the switch 86 set forth above in (c), this selector selects a stop of displaying an image represented by the optical signal or the radio wave signal when the optical signal does not present the good transmission state and the radio wave signal does not present the good transmission state.

In the third embodiment, the decoder circuit 47b in FIG. 8 may have the configuration illustrated, for example, in FIG. 6, or alternatively the configuration illustrated in FIG. 7. According to the third embodiment, as a result of the operation of the switch 86 set forth above in (c), an image displayed on the television monitor 51 represents current situations at all times not only when the decoder circuit 47b in FIG. 8 has the configuration illustrated in FIG. 6 but also when the decoder circuit 47b in FIG. 8 has the configuration illustrated in FIG. 7.

The switch 86 may be configured to perform the following operations. Specifically, the switch 86 may be responsive to the determination result signal from the received light level determination circuit 49 and the determination result signal from the received level determination circuit 89 to (a) selectively connect an image signal from the decoder circuit 47a (image signal transmitted through an optical signal) to the television monitor 51 when the received light level is equal to or higher than the first threshold and the received level is equal to or higher than the second threshold; (b) selectively connect an image signal from the decoder circuit 47b (image signal transmitted through a radio wave signal) to the television monitor 51 when the received light level is lower than the first threshold and the received level is equal to or higher than the second threshold; and (c) selectively connect the black image data from the black image generator circuit 87 to the television monitor 51 when the received level is lower than the second threshold. In this case, similar advantages are also provided as is the case with the third embodiment.

Next, a platform monitoring system according to a fourth embodiment of the present invention will be described with reference to FIG. 9.

Figure 9:
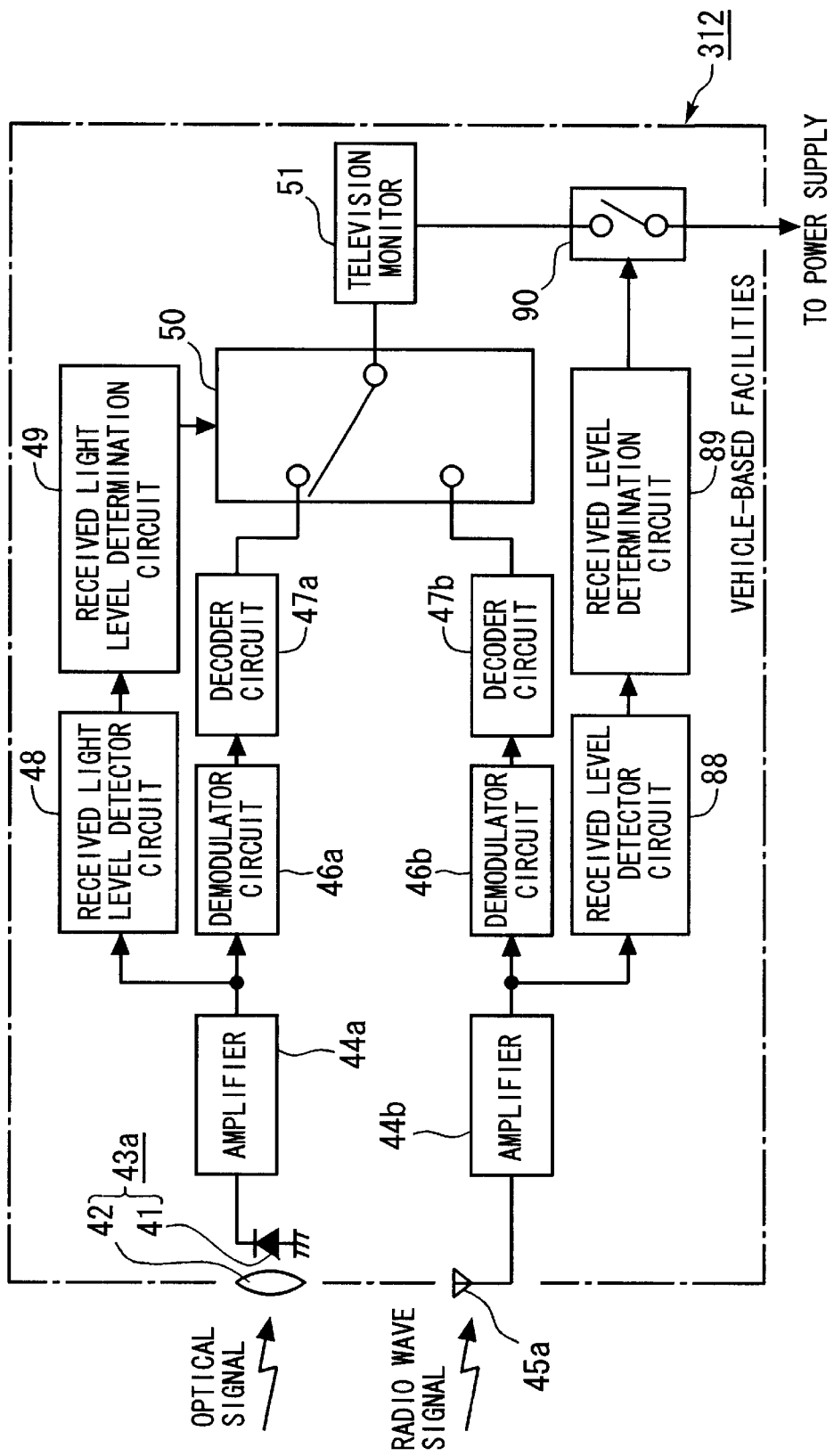
FIG. 9 is a block diagram generally illustrating vehicle-based facilities included in a platform monitoring system according to a fourth embodiment of the present invention.

FIG. 9 is a block diagram generally illustrating vehicle-based facilities 312 for the up line, which constitute the platform monitoring system according to the fourth embodiment, and are installed in a vehicle 20. In FIG. 9, components identical or corresponding to those in FIGS. 2 and 8 are designated the same reference numerals, and repetitive description is omitted.

The fourth embodiment differs from the first embodiment only in that the vehicle-based facilities 312 for the up line illustrated in FIG. 9 are used in place of the vehicle-based facilities 12 for the up line illustrated in FIG. 2, and that vehicle-based facilities for the down line are changed as well in a similar manner. In addition, the vehicle-based facilities 312 differ from the vehicle-based facilities 12 illustrated in FIG. 2 only in that a received level detector circuit 88 and a received level determination circuit 89 are added in a manner similar to the third embodiment, and that a switch 90 such as a solid-state switch is disposed in a power supply line of a television monitor 51.

The switch 90 is responsive to a determination result signal from the received level determination circuit 89 to power on the television monitor 51 to display an image represented by an output from a switch 50 on the television monitor 51 when the received level is equal to or higher than the second threshold. On the other hand, when the received level is lower than the second threshold, the switch 90 powers off the television monitor 51 to display nothing on the television monitor 51.

In the fourth embodiment, detector circuits 48, 88, determination circuits 49, 89, switch 50 and switch 90 constitute a selector for selecting one of an image signal transmitted through an optical signal and an image signal transmitted through a radio wave signal, such that an image represented by a selected image signal is displayed on the monitor 51. Then, the detector circuits 48, 88, determination circuits 49, 89, switch 50 and switch 90 perform the following operation. Specifically, in response to a determination result signal from the received light level determination circuit 49 and a determination signal from the received level determination circuit 89, (a) an image represented by an image signal from a decoder circuit 47*a* (image signal transmitted through an optical signal) is selectively displayed on the television monitor 51 when the received light level is equal to or higher than the first threshold and the received level is equal to or higher than the second threshold; (b) an image represented by an image signal from a decoder circuit 47*b* (image signal transmitted through a radio wave signal) is selectively displayed on the television monitor 51 when the received light level is lower than the first threshold and the received level is equal to or higher than the second threshold; and (c) no image is displayed on the television monitor 51 when the received level is lower than the second threshold. Therefore, the fourth embodiment also provides similar advantages to those of the third embodiment.

Also, in the fourth embodiment, the decoder circuit 47*b* in FIG. 9 may have the configuration illustrated, for example, in FIG. 6, or alternatively the configuration illustrated in FIG. 7.

Though not shown in the figure, the switch 90 may perform the following operations based on the determination result signal from the received light level determination circuit 49 and the determination result signal from the received level determination circuit 89. Specifically, the switch 90 may (a) power on the television monitor 51 when the received light level is equal to or higher than the first threshold; (b) power on the television monitor 51 when the received light level is lower than the first threshold and the received level is equal to or higher than the second threshold; and (c) power off the television monitor 51 when the received light level is lower than the first threshold and the received level is lower than the second threshold. In this case, the similar advantages are also provided as is the case with the third embodiment.

Next, a platform monitoring system according to a fifth embodiment of the present invention will be described with reference to FIG. 10.

Figure 10:
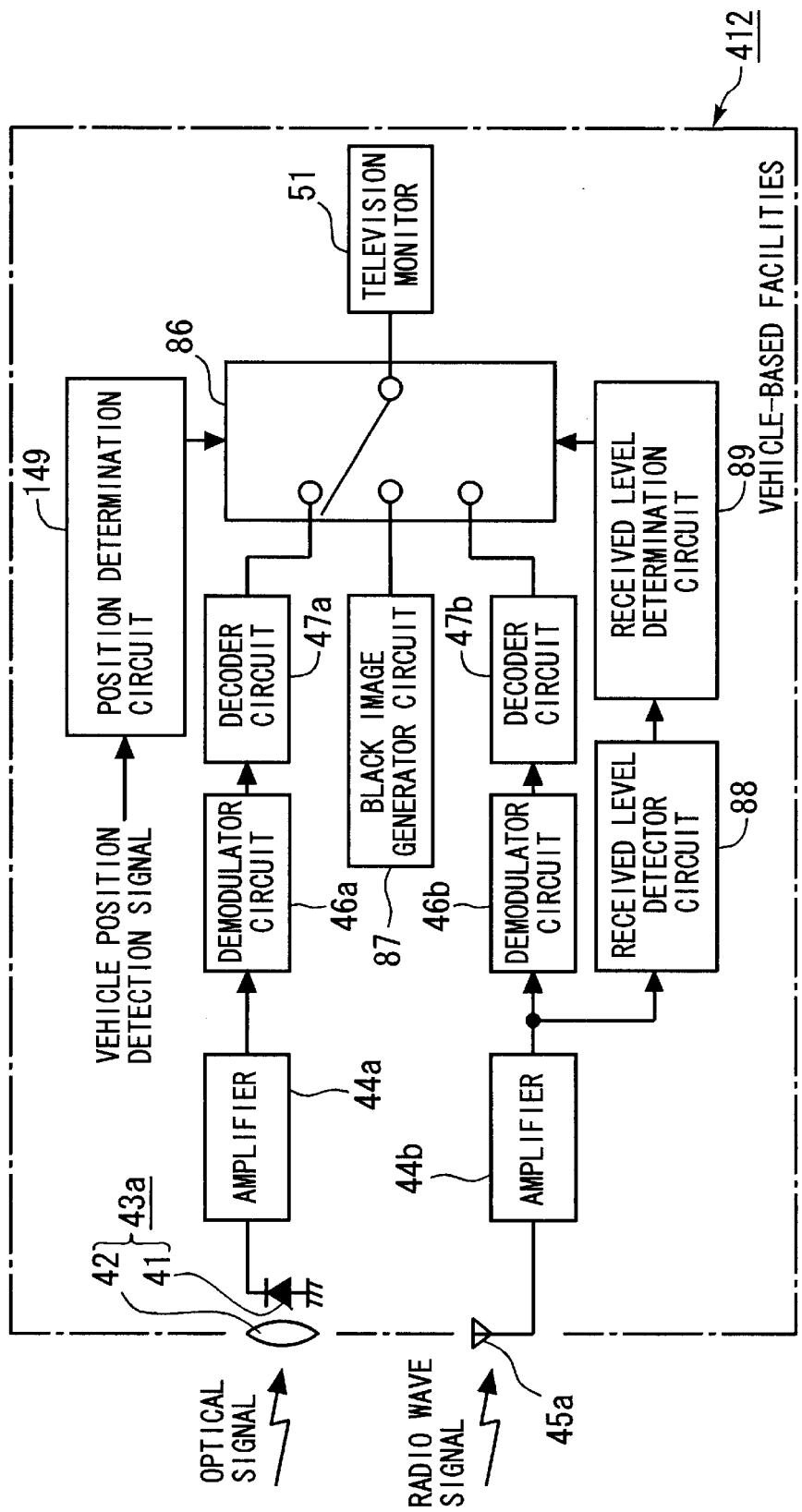
FIG. 10 is a block diagram generally illustrating vehicle-based facilities included in a platform monitoring system according to a fifth embodiment of the present invention.

FIG. 10 is a block diagram generally illustrating vehicle-based facilities 412 for the up line, which constitute the platform monitoring system according to the fifth embodiment, and are installed in a vehicle 20. In FIG. 10, components identical or corresponding to those in FIGS. 2, 4 and 8 are designated the same reference numerals, and repetitive description is omitted.

The fifth embodiment differs from the first embodiment only in that the vehicle-based facilities 412 for the up line illustrated in FIG. 10 are used in place of the vehicle-based facilities 12 for the up line illustrated in FIG. 2, and that vehicle-based facilities for the down line are changed as well in a similar manner. In addition, the vehicle-based facilities 412 differ from the vehicle-based facilities 212 illustrated in FIG. 8 only in that the received light level detector circuit 48 is removed and a position determination circuit 149 is used in place of the received light level determination circuit 49, and in the operation of a switch 86. The position determination circuit 149 receives a position detection signal from a position detector (not shown) inherently mounted in the vehicle 20 for detecting the position of the vehicle 20, and determines whether or not the vehicle 20 is positioned within the range R11 in FIG. 3 based on this position detection signal.

In the fifth embodiment, the switch 86 is responsive to a determination result signal from the position determination circuit 149 and a determination result signal from a received level determination circuit 89 to (a) selectively connect an image signal from a decoder circuit 47*a* (an image signal transmitted through an optical signal) to the television monitor 51 when the vehicle 20 is positioned within the range R11; (b) selectively connect an image signal from a decoder circuit 47*b* (image signal transmitted through a radio wave signal) to the television monitor 51 when the vehicle 20 is not positioned within the range R11 and the received level is equal to or higher than the second threshold; and (c) selectively connect black image data from a black image generator circuit 87 to the television monitor 51 when the vehicle 20 is not positioned within the range R11 and the received level is lower than the second threshold.

As is understood from the foregoing description, in the fifth embodiment, a detector circuit 88, determination circuit 149, 89 and switch 86 constitute a selector for selecting one of an image signal transmitted through an optical signal and an image signal transmitted through a radio wave signal, such that an image represented by a selected image signal is displayed on the monitor 51. In the fifth embodiment, due to the operation of the switch 86 set forth above in (c), this selector selects a stop of displaying an image represented by the optical signal or the radio wave signal when the vehicle 20 is positioned out of the region around the stopping position and the radio wave signal does not present the good transmission state.

The fifth embodiment also provides similar advantages to those of the third embodiment. Also, in the fifth embodiment, the decoder circuit 47*b* in FIG. 10 may have the configuration illustrated, for example, in FIG. 6, or alternatively the configuration illustrated in FIG. 7.

Next, a platform monitoring system according to a sixth embodiment of the present invention will be described with reference to FIG. 11.

Figure 11:
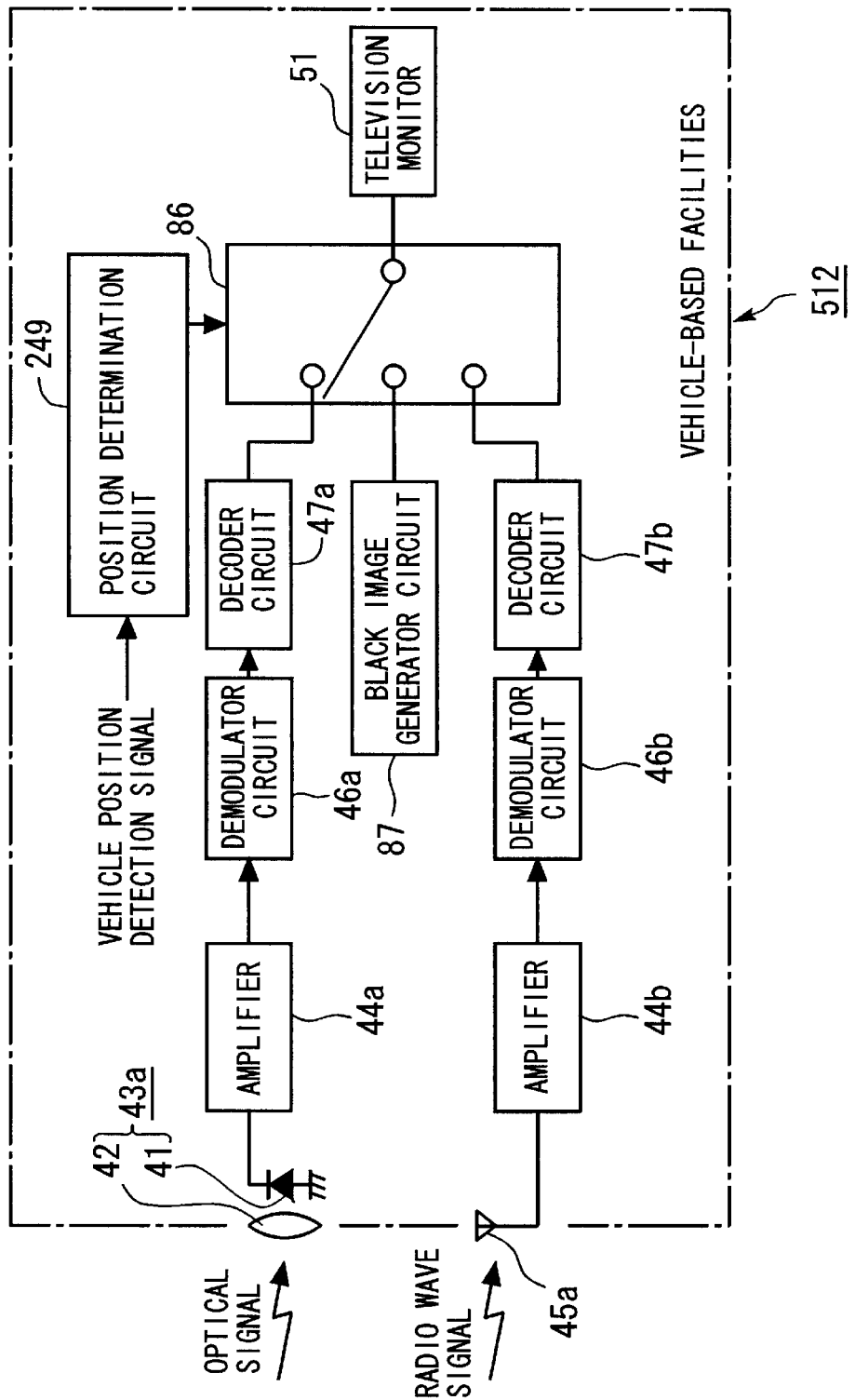
FIG. 11 is a block diagram generally illustrating vehicle-based facilities included in a platform monitoring system according to a sixth embodiment of the present invention.

FIG. 11 is a block diagram generally illustrating vehicle-based facilities 512 for the up line, which constitute the platform monitoring system according to the sixth embodiment, and are installed in a vehicle 20. In FIG. 11, components identical or corresponding to those in FIGS. 2, 4 and 8 are designated the same reference numerals, and repetitive description is omitted.

The sixth embodiment differs from the first embodiment only in that the vehicle-based facilities 512 for the up line illustrated in FIG. 11 are used in place of the vehicle-based facilities 12 for the up line illustrated in FIG. 2, and that vehicle-based facilities for the down line are changed as well in a similar manner. In addition, the vehicle-based facilities 512 differ from the vehicle-based facilities 212 illustrated in FIG. 8 only in that the received light level detector circuit 48 is removed and a position determination circuit 249 is used in place of the received light level determination circuit 49, in that the received level detector circuit 88 and the received level determination circuit 89 are removed, and in the operation of a switch 86. The position determination circuit 249 receives a position detection signal from a position detector (not shown) inherently mounted in the vehicle 20 for detecting the position of the vehicle 20, and determines, based on this position detection signal, (a) whether or not the vehicle 20 is positioned within the range R11 in FIG. 3, (b) whether or not the vehicle is poisoned out of the range R11 and within the range R12, and (c) whether or not the vehicle is poisoned out of the range R11 and out of the range R12.

In the sixth embodiment, the switch 86 is responsive to a determination result signal from the position determination circuit 249 to (a) selectively connect an image signal from a decoder circuit 47*a* (an image signal transmitted through an optical signal) to the television monitor 51 when the vehicle 20 is positioned within the range R11; (b) selectively connect an image signal from a decoder circuit 47b (image signal transmitted through a radio wave signal) to the television monitor 51 when the vehicle 20 is not positioned within the range R11 and the vehicle 20 is positioned the range R12; and (c) selectively connect black image data from a black image generator circuit 87 to the television monitor 51 when the vehicle 20 is not positioned within the range R11 and the vehicle 20 is not poisoned within the range R12.

As is understood from the foregoing description, in the sixth embodiment, a position determination circuit 249 and switch 86 constitute a selector for selecting one of an image signal transmitted through an optical signal and an image signal transmitted through a radio wave signal, such that an image represented by a selected image signal is displayed on the monitor 51. In the sixth embodiment, due to the operation of the switch 86 set forth above in (c), this selector selects a stop of displaying an image represented by the optical signal or the radio wave signal when the vehicle 20 is positioned out of the region around the stopping position P10 and the vehicle 20 is positioned out of the range from the region around the stopping position P10 to the predetermined position behind the stopping position in the vehicle running direction.

The sixth embodiment also provides similar advantages to those of the third embodiment. Also, in the sixth embodiment, the decoder circuit 47b in FIG. 11 may have the configuration illustrated, for example, in FIG. 6, or alternatively the configuration illustrated in FIG. 7.

While several embodiments of the present invention have been described, the present invention is not limited to these embodiments.

For example, in the present invention, the quality of an image transmitted through an optical signal may be identical to the quality of an image transmitted through the radio wave signal, in which case the encoder circuits 25a, 25b in FIG. 1 may be replaced with a single encoder circuit.

As described above, the present invention permits the operator to perform reliable and appropriate monitoring required for ensuring the safety for passengers, and reduces the number of light emitters to enable a reduction in the cost and labor for installation.

What is claimed is:

1. A platform monitoring system comprising:
an imager device installed on the ground side for capturing a situation on a platform;
a wireless transmission unit for transmitting an image captured by said imager device to a vehicle side;
a display unit installed on the vehicle side for displaying an image transmitted by said wireless transmission unit,
wherein said wireless transmission unit includes:
an optical transmitter installed on the ground side for transmitting an image captured by said imager device as an optical signal;
a radio wave transmitter installed on the ground side for transmitting the image as a radio wave signal;
an optical receiver installed on the vehicle side for receiving an optical signal transmitted from said optical transmitter;
a radio wave receiver installed on the vehicle side for receiving a radio wave signal transmitted from said radio wave transmitter; and
a selector for selecting one of the optical signal received by said optical receiver and the radio wave signal received by said radio wave receiver,
said optical transmitter and said optical receiver are positioned such that a vehicle position range in which signal transmission through the optical signal can be achieved includes a region around a predetermined stopping position of the vehicle with respect to the platform,
said radio wave transmitter and said radio wave receiver are positioned such that a vehicle position range in which signal transmission through the radio wave signal can be achieved includes a range from a region around the stopping position to a predetermined position behind the stopping position in a vehicle running direction, and
an image represented by a signal selected by said selector is selectively displayed on said display unit.

2. A platform monitoring system according to claim 1, wherein:
said selector is responsive to a transmission state of an optical signal between said optical transmitter and said optical receiver for selecting the optical signal when the optical signal presents a good transmission state, and the radio wave signal when the optical signal does not present the good transmission state.

3. A platform monitoring system according to claim 1, wherein:
said selector includes an optical signal level detector for detecting a level of an optical signal received by said optical receiver, wherein said selector selects the optical signal when a level detected by said optical signal level detector is equal to or higher than a predetermined level, and selects the radio wave signal when the level detected by said optical signal level detector is lower than the predetermined level.

4. A platform monitoring system according to claim 1, wherein:
said selector is responsive to the position of the vehicle for selecting the optical signal when the vehicle is positioned in the region around the stopping position, and the radio wave signal when the vehicle is positioned out of the region around the stopping position.

5. A platform monitoring system according to claim 1, wherein:
said selector is responsive to a transmission state of an optical signal between said optical transmitter and said optical receiver and a transmission state of a radio wave signal between said radio wave transmitter and said radio wave receiver for selecting:
(a) the optical signal when the optical signal presents a good transmission state;
(b) the radio wave signal when the optical signal does not present the good transmission state and the radio wave signal presents a good transmission state; and
(c) a stop of displaying an image represented by the optical signal or the radio wave signal when the optical signal does not present the good transmission state and the radio wave signal does not present the good transmission state,
wherein an image represented by the optical signal or the radio wave signal is not displayed on said display unit when said selector selects the stop of displaying.

6. A platform monitoring system according to claim 1, wherein:
said selector includes an optical signal level detector for detecting a level of an optical signal received by said optical receiver, and a radio wave signal level detector for detecting a level of a radio wave signal received by said radio wave receiver, wherein said selector selects:
(a) the optical signal when a level detected by said optical signal level detector is equal to or higher than a first level;
(b) the radio wave signal when the level detected by said optical signal level detector is lower than the first level and a level detected by said radio wave signal level detector is equal to or higher than a second level; and
(c) a stop of displaying an image represented by the optical signal or the radio wave signal when the level detected by said optical signal level detector is lower than the first level and the level detected by said radio wave signal level detector is lower than the second level,
wherein an image represented by the optical signal or the radio wave signal is not displayed on said display unit when said selector selects the stop of displaying.

7. A platform monitoring system according to claim 1, wherein:
said selector is responsive to a transmission state of an optical signal between said optical transmitter and said optical receiver and a transmission state of a radio wave signal between said radio wave transmitter and said radio wave receiver for selecting:
(a) the optical signal when the optical signal presents a good transmission state and the radio wave signal presents a good transmission state;
(b) the radio wave signal when the optical signal does not present the good transmission state and the radio wave signal presents the good transmission state; and
(c) a stop of displaying an image represented by the optical signal or the radio wave signal when the radio wave signal does not present the good transmission state,
wherein an image represented by the optical signal or the radio wave signal is not displayed on said display unit when said selector selects the stop of displaying.

8. A platform monitoring system according to claim 1, wherein:
said selector includes an optical signal level detector for detecting a level of an optical signal received by said optical receiver, and a radio wave signal level detector for detecting a level of a radio wave signal received by said radio wave receiver,
wherein said selector selects:
(a) the optical signal when a level detected by said optical signal level detector is equal to or higher than a first level and a level detected by said radio wave signal level detector is equal to or higher than a second level;
(b) the radio wave signal when the level detected by said optical signal level detector is lower than the first level and the level detected by said radio wave signal level detector is equal to or higher than the second level; and
(c) a stop of displaying an image represented by the optical signal or the radio wave signal when the level detected by said radio wave signal level detector is lower than the second level,
wherein an image represented by the optical signal or the radio wave signal is not displayed on said display unit when said selector selects the stop of displaying.

9. A platform monitoring system according to claim 1, wherein:
said selector is responsive to a position of the vehicle and a transmission state of a radio wave signal between said radio wave transmitter and said radio wave receiver for selecting:
(a) the optical signal when the vehicle is positioned in the region around the stopping position;
(b) the radio wave signal when the vehicle is positioned out of the region around the stopping position and the radio wave signal presents a good transmission state; and
(c) a stop of displaying an image represented by the optical signal or the radio wave signal when the vehicle is positioned out of the region around the stopping position and the radio wave signal does not present the good transmission state,
wherein an image represented by the optical signal or the radio wave signal is not displayed on said display unit when said selector selects the stop of displaying.

10. A platform monitoring system according to claim 1, wherein:
said selector includes a radio wave signal level detector for detecting a level of a radio wave signal received by said radio wave receiver, wherein:
said selector selects:
(a) the optical signal when the vehicle is positioned in the region around the stopping position;
(b) the radio wave signal when the vehicle is positioned out of the region around the stopping position and a level detected by said radio wave signal level detector is equal to or higher than a predetermined level; and
(c) a stop of displaying an image represented by the optical signal or the radio wave signal when the vehicle is positioned out of the region around the stopping position and the level detected by said radio wave signal level detector is lower than the predetermined level,
wherein an image represented by the optical signal or the radio wave signal is not displayed on said display unit when said selector selects the stop of displaying.

11. A platform monitoring system according to claim 1, wherein:
said selector is responsive to the position of the vehicle for selecting:
(a) the optical signal when the vehicle is positioned in the region around the stopping position;
(b) the radio wave signal when the vehicle is positioned out of the region around the stopping position and the vehicle positioned in the range from the region around the stopping position to the predetermined position behind the stopping position in the vehicle running direction; and
(c) a stop of displaying an image represented by the optical signal or the radio wave signal when the vehicle is positioned out of the region around the stopping position and the vehicle is positioned out of the range from the region around the stopping position to the predetermined position behind the stopping position in the vehicle running direction,
wherein an image represented by the optical signal or the radio wave signal is not displayed on said display unit when said selector selects the stop of displaying.

12. A platform monitoring system according to claim 1, wherein:
an image transmitted through the optical signal has a quality higher than an image transmitted through the radio wave signal.

* * * * *